May 7, 1968          J. D. CLARY          3,381,944
APPARATUS FOR CONVEYING AND BLENDING SOLIDS
Filed Nov. 21, 1963          3 Sheets-Sheet 3
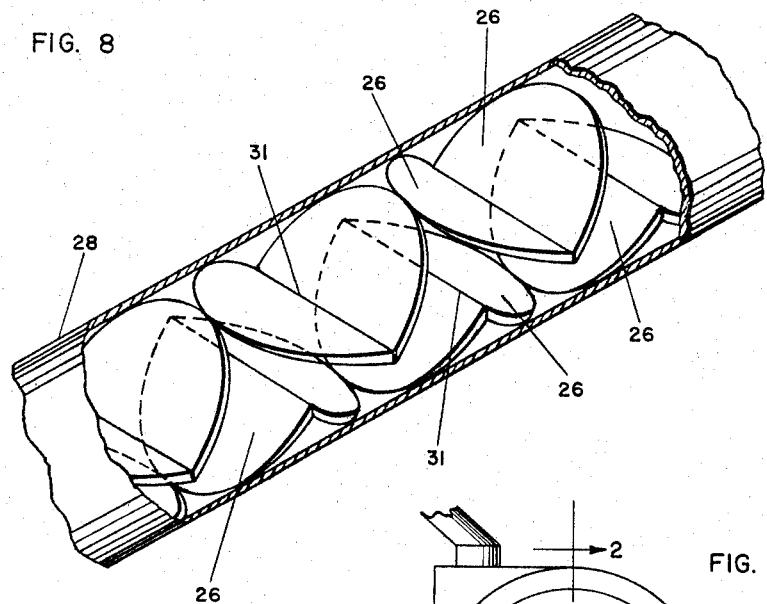
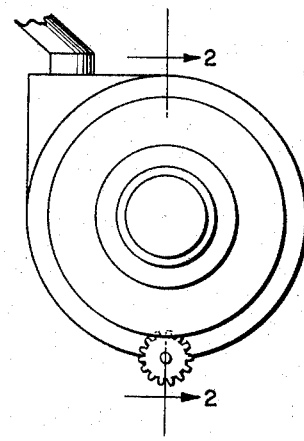
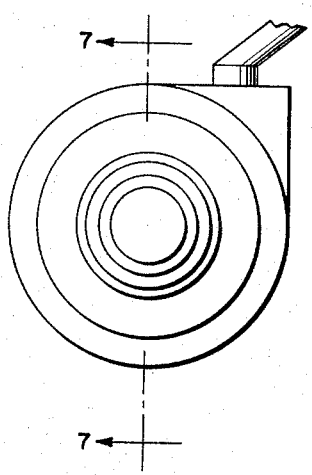
INVENTOR
J.D. CLARY
BY *Kenneth E. Prince*
ATTORNEY

United States Patent Office 3,381,944
Patented May 7, 1968

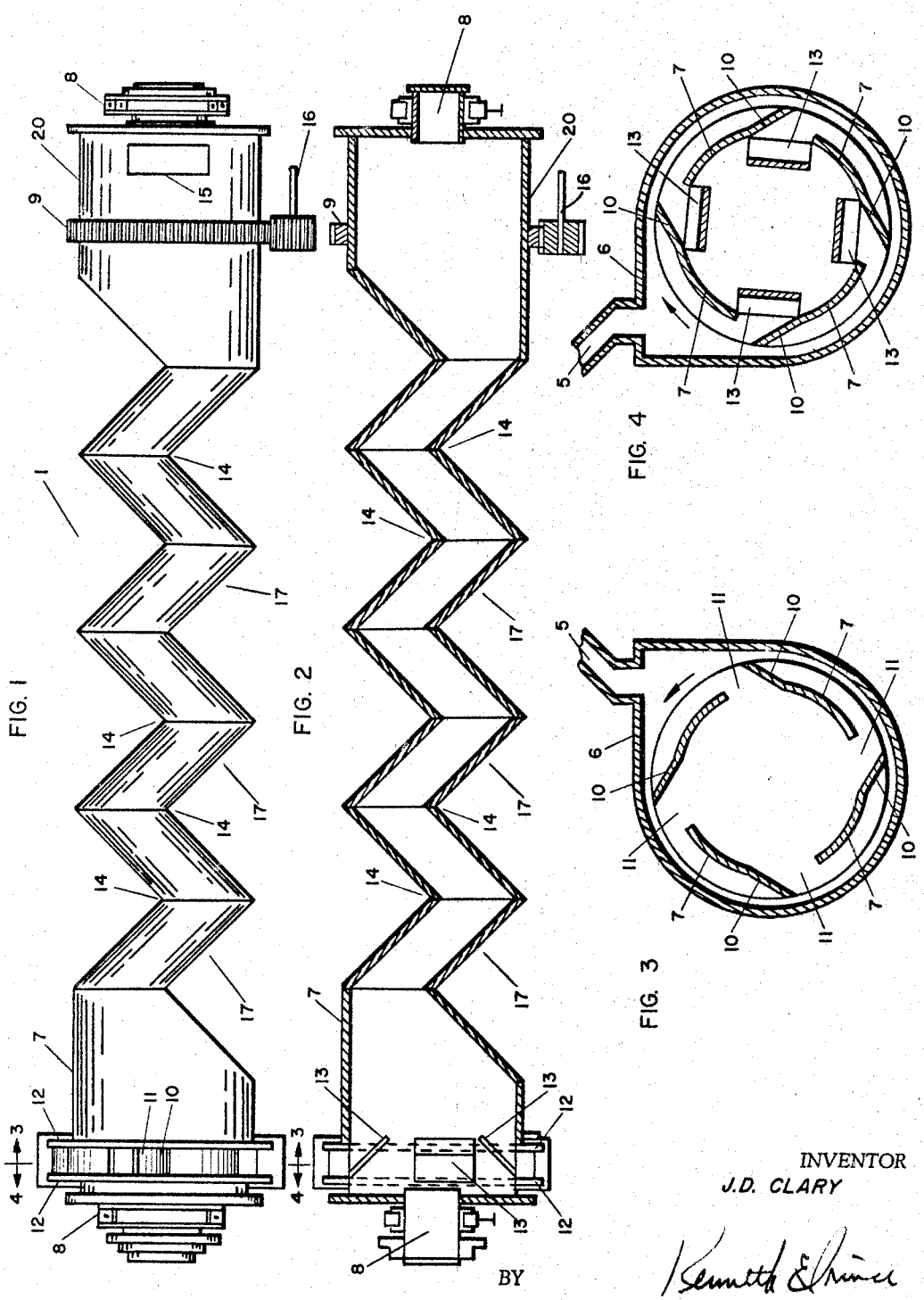

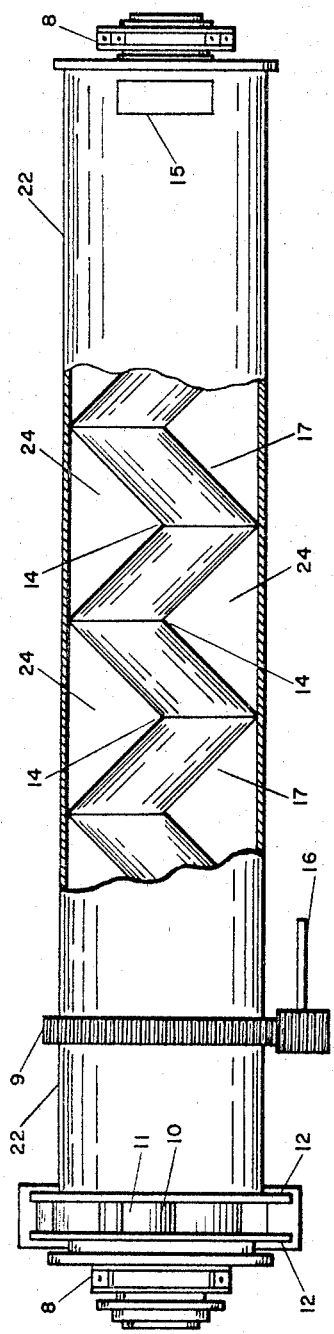
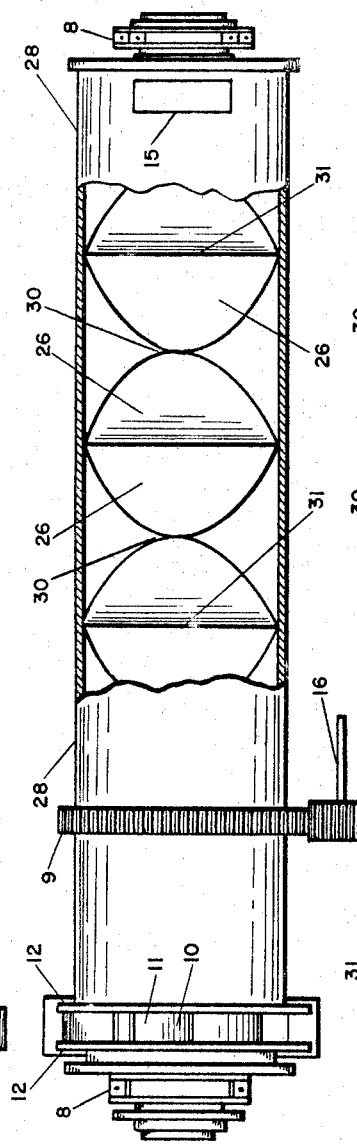
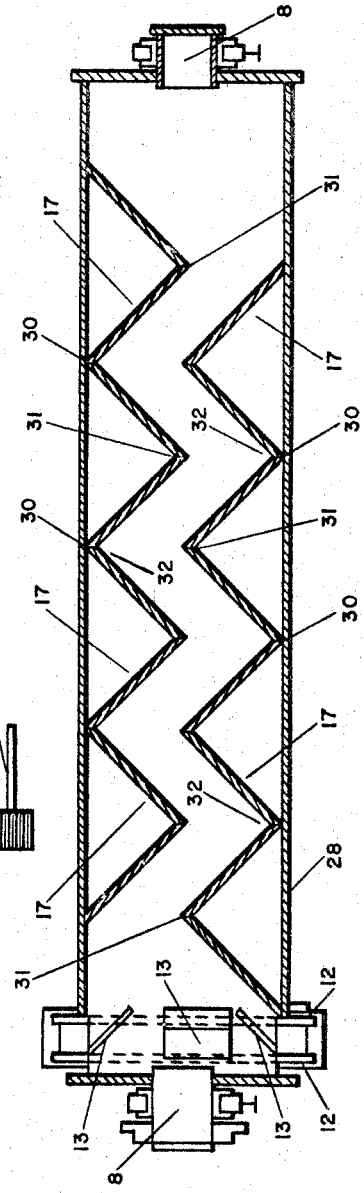

3,381,944
APPARATUS FOR CONVEYING AND
BLENDING SOLIDS
Joe D. Clary, Lakeland, Fla., assignor to W. R. Grace
& Co., New York, N.Y., a corporation of Connecticut
Continuation-in-part of application Ser. No. 75,143,
Dec. 12, 1960. This application Nov. 21, 1963, Ser.
No. 325,283
3 Claims. (Cl. 259—3)

This is a continuation-in-part of my copending application Ser. No. 75,143 filed Dec. 12, 1960, now abandoned.

This invention relates to a device for the simultaneous conveying and blending of solids.

In summary, this invention is directed to an apparatus for simultaneously conveying and blending solids. The blender-conveyer combination of this invention is a mixer generally horizontally disposed, supported for rotating around its longitudinal axis, equipped with means for effecting said rotation, and provided with an entrance at one end for the admittance of material and an exit at the other end for the discharge of material, the improvement comprising a mixer consisting of a plurality of twin-shell blenders connected in series, with one end of said series of blenders in communication with a first closed cylinder, and with the other end of said series of blenders in communication with a second closed cylinder.

Preferred embodiments include: (a) increasing the structural strength of the blender-conveyor by extending the first and second cylinders over the series of twin-shell blenders in such manner that said cylinders communicate with each other, thereby to encase said series of blenders in a single cylinder so constructed that material fed into the entrance end of said cylinder is passed through the series of blenders to the exit end of said cyilnder and subsequently from the blender-conveyer without entering the space between the series of blenders and the cylinder encasing said blenders; and (b) constructing said series of twin-shell blenders within a closed cylinder having an entrance at one end and an exit at the other by attaching two series of V-shaped wedge-like baffles to the opposite sides of the inside surface of said cylinder in alternate order, whereby the apices of one series are positioned about opposite the depressions (or valleys) between the members of the opposing series to define a zigzag (or tortuous) passage through said blender-conveyer.

In the drawings:

FIG. 1 is a perspective view of one embodiment of the apparatus; FIG. 9 is an elevational view of the upstream (feed) end of the apparatus shown in FIG. 1. FIG. 2 is a longitudinal section along line 2—2 of FIG. 9, FIG. 3 is a transverse section along line 3—3 of FIG. 1 showing a preferred housing and material intake scoop arrangement; FIG. 4 is a transverse section along line 4—4 of FIG. 1 showing baffles on the feed scoop; FIG. 5 is a partially cut away perspective view of a preferred embodiment of the instant invention in which structural strength is added to the device by encasing the series of twin-shell blenders in a cylinder; FIG. 6 is a partially cut away perspective view of a preferred embodiment of the instant invention in which a series of twin-shell blenders is constructed by mounting two series of V-shaped wedge-like baffles alternately along opposite sides of the inside surface of a cylinder; FIG. 10 is an elevational view of the downstream (exit) end of the apparatus shown in FIG. 5. FIG. 7 is a longitudinal section along line 7—7 of FIG. 10; and FIG. 8 is an isometric drawing showing a preferred arrangement of the V-shaped wedge-like baffles within the aforesaid cylinder.

An almost infinite number of blenders and conveyers are disclosed in chemical and mechanical art and literature. Among the blenders in common usage for mixing solids with solids is the twin-shell blender which is also called the V-blender; this is a most efficient mixing device. In the twin-shell blender, mixing is achieved by the dividing and redividing of the solids followed by the subsequent tumbling of the solids against sloping sides of the blender as the entire apparatus is rotated. Thus, the relative disposition of the solids is constantly changed, allowing no opportunity for the segregation of either smaller or heavier particles. In this machine, uniformity is reached in a short time. When additions as small as one or two percent are made, they are incorporated into the larger quantity in the same period, thereby producing a homogeneous product.

Of the conveyers in common usage, perhaps one of the simplest is the screw conveyer. Ordinarily, such a conveyer consists of a long-pitch helix mounted on a shaft or spindle carried on bearings within a U-shaped trough or cylinder. As the element rotates, the material fed to it is moved forward by the thrust of the lower part of the helix and is discharged through openings in the trough bottom or at the end. When properly applied, such a conveyer does an excellent job at relatively low operating cost. It is a simple machine to maintain, replacements are inexpensive, and it is readily made dust tight. For many functions it is the best type of conveyer.

In most conveyers, some mixing necessarily occurs, but these devices are not constructed for mixing. Blenders are normally designed to mix without transfer of materials. Rarely is it desirable to mix and convey simultaneously.

In the manufacture of superphosphate, phosphate rock, which is essentially calcium phosphate containing about three percent of calcium fluoride, is treated with a strong mineral acid. The final product is monocalcium phosphate. If sulfuric acid is used, the product has an available phosphate content of about 18–20% by weight (measured as $P_2O_5$), whereas the available phosphate content is 48–52% if phosphoric acid is used. In either case, the major portion of the fluorine is liberated as silicon tetrafluoride during the acidulation and is evolved as a gas. However, there is always a small amount of fluorine not immediately liberated but which is slowly released as the product ages. When phosphatic materials are packaged in paper bags, the silicon tetrafluoride attacks the bags as it is liberated and causes them to rot during normal storage and shipping. Various measures have been adapted in attempting to avoid this. Both paper bags and asphalt laminated bags are found to be unsuitable, inasmuch as they are unable to withstand the corrosive powers of the superphosphate. One solution to this problem was to coat the pellets of superphosphate with lime, the latter being a relatively inexpensive commodity and a satisfactory base for the neutralization of the liberated silicon tetrafluoride. However, this solution brought to light still another problem, which is how to go about getting a fairly even, but not excessive, coat of lime on the superphosphate particles. For reasons of economy, it is also desirable not to add extensively to the overall process for the manufacture of superphosphate fertilizer. In other words, it is desirable to combine such a mixing step with another step already present in the manufacturing process.

One possible method is to sprinkle the lime directly on the superphosphate or triple superphosphate fertilizer material as this material moves along on a conveyer belt. While it is possible to attain mixing by such a procedure, there are several rather important objections. First, the lime is extremely dusty and creates considerable hazard not only when it is added to the superphosphate, but also when the mixture of lime and superphosphate are poured from the belt into suitable containers for packaging. Also, such a process proves to be highly uneconomical in that a large ratio of lime to superphosphate is needed for a satisfactory coating. Although the cost of the lime is not exorbitant, it must be considered. But even more important is the effect of excess lime on the final fertilizer product. With a considerable percent by weight of the product being taken up in lime, the weight of plant nutrient from the superphosphate per unit of fertilizer is considerably diminished. At best, this loss can be only partially compensated for, and such compensation requires a complete redistribution of the reactants in superphosphate manufacture.

One means that might seem appropriate is a simple screw conveyer. Although the primary task of the screw conveyer is to transfer solids from the place of entry to the discharge spout, some mixing unavoidably takes place. Such mixing action can be accentuated by using spirals which are suitably notched or which carry small rakes on the shaft. However, when tried, such a device proved unsatisfactory, because thorough and uniform mixing of the lime and superphosphate could not be achieved.

To overcome the disadvantages and to accomplish the desirable results suggested above, I have constructed a combination blender-conveyer which produces the simultaneous conveying and thorough mixing of the superphosphate and lime.

It is an object of this invention to combine the simple operation of the screw conveyer and capacity of a mixing barrel with the effectiveness of the twin-shell blender in providing for the simultaneous mixing and conveying of solids. It is a further object of this invention to accomplish the simultaneous blending and conveying of solids of varying particle size. It is a further and specific object of this invention to provide a satisfactory method for the simultaneous blending and conveying of a mixture of lime and superphosphate granules in which a minimum of lime is used to obtain a coat of maximum uniformity and of sufficient thickness to neutralize all acid present.

The apparatus of this invention is a blender-conveyer combination comprising a mixer consisting substantially of a plurality of twin-shell blenders connected in series with one end of said series of blenders in communication with a first closed cylinder and with the other end of said series of blenders in communication with a second closed cylinder; said blender conveyer combination is generally horizontally disposed, supported for rotating around its longitudinal axis by a set of trunnion bushings and supports at each end. The apparatus of this invention is equipped with means for effecting said rotation (e.g., a drive mechanism powered by a motor, a steam turbine, or the like) and provided with an entrance at one end for receiving material and an exit at the other end for the discharge of material. Material can be fed into the entrance end of said blender-conveyer by any conventional means (e.g., rotating scoops, a screw conveyer, or the like). Other means to support and drive the blender-conveyer will be obvious to those skilled in the art. Examples of such means include those used with conventional rotary driers or kilns (i.e., trunnion rings and rollers with thrust rollers for control of lateral movement, and a ring gear for drive). Adjacent to one end of the first cylinder is a feed hopper and feeding means. I prefer to feed material into the first cylinder via an arrangement comprising a dust-tight housing around the first cylinder with a lead-in chute for the introduction of the materials to be mixed. Inside the housing, there are several, usually four, apertures through which the material from the housing can enter the inside of the cylinder. At the edges of these apertures there are scoops reaching into the housing for the purpose of directing material from the housing through the apertures. For the better direction of this material as well as for mechanical support of the scoops, there are flanges around the outside of the first cylinder's wall, inside the housing, immediately above and below the scoops. As a final means for directing the material, once inside the first cylinder, toward the series of twin-shell blenders, there is a series of baffles, one of which is attached to the outside wall of the first cylinder immediately below each aperture and arranged at such an angle as to guide the material toward the body of said cylinder. When using a screw conveyer to feed material into the apparatus of this invention, I prefer to support the entrance end of the apparatus with a large hollow axle which passes through a supported bearing. Feed material, from the screw conveyer, is fed into the first cylinder through said hollow axle.

The actual blending takes place in the series of twin-shell blenders. Thus, as the apparatus is rotated the material falls through each blender in succession as said material moves forward (toward the exit end of the system) through the apparatus, thereby giving forward flight-to-flight mixing. At the same time a portion of said material moves backward (toward the inlet end of the system) through the system, thereby giving backward flight-to-flight mixing.

Referring to FIGS. 1–4 of the drawings, the materials to be mixed and conveyed are introduced via chute 5 into a dust-tight housing 6 encircling first cylinder 7 adjacent to one end and mounted in a fixed position by means not shown. The apparatus, shown generally at 1, is supported at each end for rotation about its longitudinal axis by suitable trunnions, bushings and supports, as shown at 8. A suitable driving means 16 can be operatively associated with sprocket 9 or other appropriate means. As the apparatus 1 rotates, the scoops 10 pick up the material from said housing 6 and direct it into and through the apertures 11, into the interior of the first cylinder 7. The material is further guided by flanges 12 extending outwardly from first cylinder 7 along each side of scoops 10. It is thrown against baffles 13 which are slanted so as to deflect it towards the interior of first cylinder 7. On rotation, the loose solid material flows into the series of twin-shell blenders 17. As the apparatus, which is tilted to favor the flow of solid material toward the outlet (or exit) 15, rotates, said solid material flows past the apices (or tips) 14 of the series of twin-shell blenders 17. At each apex 14, said material is divided. Part of this material flows down the upstream side of the twin-shell blender (backward flow) where it becomes commingled with material fed forward (downstream) from the preceding (upstream) blender of the series, and part flows down the downstream side (forward flow) where it is commingled with material which (by backward flow) tumbled down the upstream side of the next (downstream) twin-shell blender of the series of said blenders. Thus, both forward and backward flight-to-flight mixing are obtained in the blender-conveyer of this invention. Additional material is fed in continuously so that the trend is for the material to move forward (downstream) toward the exit end of the apparatus. Due to the rotation and the repeated dividing action, the material is mixed and simultaneously conveyed down the length of the blender to second cylinder 20 from which said material is discharged via outlet 15.

The rate at which the material travels the length of the apparatus of this invention can be varied by tilting said apparatus, by varying the number of twin-shell blenders, or by varying the slopes of said twin-shell blenders. However, decreasing the number of said blenders in series or decreasing the slopes thereof will produce a decrease in mixing efficiency. For maximum mixing efficiency, where transit time is not critical, additional twin-shell blenders can be inserted in the series of said blenders and their walls can be made steeper.

Referring to FIG. 5 of the drawings, this figure shows a partially cut away perspective view of a preferred embodiment of the apparatus of this invention in which structural strength is added to the device by extending the first and second cylinders (7 and 20 of FIG. 1) over the entire length of the series of twin-shell blenders 17 in such manner that said first and second cylinders communicate with each other, thereby encasing said series of blenders in a single cylinder 22 so constructed that material fed into the entrance end of said cylinder is passed into and through the series of blenders to the exit end of said cylinder and subsequently from the blender-conveyer, via exit 15, without entering the space 24 between said series of blenders and said cylinder. If desired, additional structural strength can be given to this unit by attaching (e.g., by welding or riveting) the twin-shell blenders to the wall of the cylinder in which the blenders are encased. Also, members (e.g., iron straps) can be used to attach said blenders to the inner surface of said cylinder.

FIGS. 6–8 show another preferred embodiment of the apparatus of this invention in which a series of twin-shell blenders is constructed within a cylinder by mounting two series of V-shaped wedge-like baffles along the opposite sides of the inner surface of said cylinder. FIG. 6 is a partially cut away perspective view of said preferred embodiment. FIG. 7 is a longitudinal section along line 7—7 of FIG. 6, and FIG. 8 is an isometric drawing showing a preferred arrangement of said V-shaped wedge-like baffles within said cylinder. The construction of the apparatus of this embodiment of my invention is simpler than that of the other embodiments. The device of this embodiment is less expensive, and its throughput capacity is greater than that of the other embodiments. Accordingly, this embodiment of the instant invention is generally preferred.

The drawings (FIGS. 6–8) show that this embodiment of my invention comprises a series of twin-shell blenders (or V-blenders) 17 constructed within a closed cylinder 28 having entrances (or apertures) 11 at one end and an exit 15 at the other end. Said series of blenders was constructed by attaching a plurality of V-shaped wedge-like baffles 26, in alternate order, in two opposing series to the opposite sides of the inside (or inner) surface of said cylinder to define a zigzag (or tortuous) passage through the resulting blender-conveyer.

As shown in FIGS. 6–8, the V-shaped wedge-like baffles are so mounted that the base 30 of each baffle (except the first and last) touches the bases of two other baffles of the same series. This is optional, and, if desired, space can be left between any or all of said baffles. However, it is always necessary for the apices (or tips) 31 of each series of baffles to be positioned opposite, or about opposite, the depressions (or valleys) 32 of the opposite series of baffles to secure proper mixing and to maintain an open and unclogged tortuous (or zig-zag) passage through the blender-conveyer. As shown in FIGS. 6–7, each baffle has a height (or altitude) about equivalent to the radius of the cylinder in which said baffles are mounted. This is not a limitation on the apparatus of my invention, because the altitude of said baffles may be equal to, greater than, or less than the radius of said cylinder, providing that said baffles do not close the passage through said cylinder and providing that said baffles are sufficiently high to give the desired degree of mixing in a mixer of reasonable length. Also, it is not necessary for all baffles to be the same height. The pitch of said baffles can be varied considerably from that shown in FIGS. 7–8, providing that the pitch is such that: (a) both forward and backward mixing are obtained; (b) the desired degree of mixing is obtained within a cylinder of reasonable length; (c) and the rate of forward (downstream) flow through the device is not so slow as to render the use of said device economically unattractive. It is not necessary for all baffles to have the same pitch and it is not necessary for the pitch on the upstream side of a given baffle to be the same as that on the downstream side of said baffle.

The success of this invention is attested to by the satisfaction with which it solved the problem for which it was originally designed—namely, coating and neutralizing superphosphates with lime. It has been found that the apparatus of this invention distributes an even coat of lime on fertilizer particles and cuts the lime consumption to about one-third the amount required for previous less satisfactory operations.

The use of this invention is by no means limited to the fertilizer industry; it can be applied to the mixing of many combinations of dry solids. The apparatus of this invention is particularly advantageous for mixing particulate solids which cannot undergo the shearing action of mechanical stirring. By rotating the apparatus, fluent material contained therein is alternately tumbled and divided to give very efficient blending. Thus, the present apparatus combines the capacity and simplicity of a rotary drum and the efficiency of a twin-shell blender for mixing with the effective transporting ability of a screw conveyer. The apparatus of this invention is particularly effective in cases where a variety of particle or weight size is present in the mixture, a situation which often presents difficulties due to the settling effect.

What is claimed is:

1. In a blender-conveyer combination, a mixer generally horizontally disposed, supported for rotating around its longitudinal axis, equipped with means for effecting said rotation, and provided with an entrance at one end for the admittance of material and an exit at the other end for the discharge of material, the improvement comprising a mixer consisting of a plurality of twin-shell blenders connected in series with one end of said series of blenders in communication with a first closed cylinder, and with the other end of said series of blenders in communication with a second closed cylinder in which the series of twin-shell blenders is constructed within a closed cylinder having an entrance at one end and an exit at the other by attaching two series of V-shaped wedge-like baffles to the opposite sides of the inside surface of said cylinder in alternate order, whereby the apices of one series of said baffles are positioned about opposite the depressions between the members of the opposing series of said baffles to define a tortuous passage through said blender-conveyer.

2. In a blender-conveyer combination, a mixer generally horizontally disposed, supported for rotating around its longitudinal axis, equipped with means for effecting said rotation, and provided with an entrance at one end for the admittance of material and an exit at the other end for the discharge of material, the improvement comprising a mixer consisting of a plurality of twin-shell blenders connected in series with one end of said series of blenders in communication with a first closed cylinder, and with the other end of said series of blenders in communication with a second closed cylinder in which the series of twin-shell blenders consists of a closed cylinder, having an entrance at one end and an exit at the other, in which two series of V-shaped wedge-like baffles are attached to opposite sides of the inside surface of said cylinder in alternate order so that apices of one series of said baffles are positioned opposite valleys formed by the opposite series of said baffles, whereby a zig-zag passage is defined through said blender-conveyer.

3. In a blender-conveyer combination, a mixer generally horizontally disposed, supported for rotating around its longitudinally axis, equipped with means for effecting said rotation, and provided with an entrance at one end for the admittance of material and an exit at the other end for the discharge of material, the improvement comprising a mixer consisting of a plurality of twin-shell blenders connected in series with one end of said series of blenders in communication with a first closed cylinder, and with the other end of said series of blenders in communication with a second closed cylinder in which said series of twin-shell blenders consists of a plurality of V-shaped wedge-like baffles attached in alternate order in two opposing series to the opposite sides of the inside surface of a closed cylinder having an entrance at one end and an exit at the other, whereby the apices of one series are positioned about opposite the depressions between, the opposing series of said baffles to define a zig-zag passage through said blender-conveyer.

References Cited
UNITED STATES PATENTS

| | | | |
|---|---|---|---|
| 977,897 | 12/1910 | Nims | 259—175 |
| 2,907,555 | 10/1959 | Engels | 259—9 |

WALTER A. SCHEEL, *Primary Examiner.*

J. M. BELL, *Assistant Examiner.*